United States Patent
Mosek

(10) Patent No.: US 7,925,822 B2
(45) Date of Patent: Apr. 12, 2011

(54) ERASE COUNT RECOVERY

(75) Inventor: Amir Mosek, Tel Aviv (IL)

(73) Assignee: SanDisk IL Ltd, Kfar Saba (IL)

( * ) Notice: Subject to any disclaimer, the term of this patent is extended or adjusted under 35 U.S.C. 154(b) by 505 days.

(21) Appl. No.: 12/023,090

(22) Filed: Jan. 31, 2008

(65) Prior Publication Data
US 2009/0198869 A1  Aug. 6, 2009

(51) Int. Cl.
*G06F 12/00* (2006.01)
*G06F 13/00* (2006.01)
*G06F 13/28* (2006.01)

(52) U.S. Cl. .................. 711/103; 711/E12.008
(58) Field of Classification Search .................. None
See application file for complete search history.

(56) References Cited

U.S. PATENT DOCUMENTS

| | | | |
|---|---|---|---|
| 5,568,423 A * | 10/1996 | Jou et al. | 365/185.33 |
| 5,581,723 A * | 12/1996 | Hasbun et al. | 711/103 |
| 5,734,816 A * | 3/1998 | Niijima et al. | 714/8 |
| 6,687,325 B1 * | 2/2004 | Wells | 377/26 |
| 7,035,967 B2 * | 4/2006 | Chang et al. | 711/103 |
| 7,085,161 B2 * | 8/2006 | Chen et al. | 365/185.17 |
| 7,085,341 B2 * | 8/2006 | Wells | 377/26 |
| 7,181,611 B2 * | 2/2007 | Chang et al. | 713/100 |
| 7,287,118 B2 * | 10/2007 | Chang et al. | 711/103 |
| 7,409,492 B2 * | 8/2008 | Tanaka et al. | 711/103 |
| 7,657,701 B2 * | 2/2010 | Shanmuganathan | 711/103 |
| 7,690,031 B2 * | 3/2010 | Ma et al. | 726/9 |
| 2004/0083405 A1 * | 4/2004 | Chang et al. | 714/24 |
| 2004/0107377 A1 * | 6/2004 | Wells | 713/500 |
| 2004/0177212 A1 * | 9/2004 | Chang et al. | 711/103 |
| 2005/0108491 A1 * | 5/2005 | Wong et al. | 711/167 |
| 2005/0204187 A1 * | 9/2005 | Lee et al. | 714/8 |
| 2007/0106919 A1 * | 5/2007 | Chang et al. | 713/300 |
| 2007/0233931 A1 * | 10/2007 | Tanaka et al. | 711/5 |
| 2008/0077590 A1 * | 3/2008 | Pandit | 707/8 |
| 2008/0082736 A1 * | 4/2008 | Chow et al. | 711/103 |
| 2008/0276038 A1 * | 11/2008 | Tanaka et al. | 711/103 |
| 2009/0089485 A1 * | 4/2009 | Yeh | 711/103 |
| 2009/0248962 A1 * | 10/2009 | Kim et al. | 711/103 |

OTHER PUBLICATIONS

"XSR1.5 Wear Leveling Application Note", May 2007, Flash Software Group, Samsung Electronics Co., Ltd, Version 1.0, 4 pages (pp. i-ii, 1-2).*

* cited by examiner

*Primary Examiner* — Matt Kim
*Assistant Examiner* — Matthew R Chrzanowski
(74) *Attorney, Agent, or Firm* — Martine Penilla & Gencarella, LLP

(57) ABSTRACT

An erase count of a flash memory block which is lost, e.g., due to power failure is updated or replaced by using known erase counts of other blocks of the flash memory. A flash management algorithm assigns a new erase count value instead of the lost one based on either a maximum value, an average value or a value combining the maximum value of the known erase counts and some tolerance value. The known values may be obtained from wear leveling data or from a stored erase history.

26 Claims, 4 Drawing Sheets

ERASE COUNT RECOVERY

FIELD OF THE INVENTION

The invention relates in general to data storage devices and methods for an Erase operation in flash memories, and more particularly to methods of updating a lost or invalid erase count of a given block of a flash memory.

BACKGROUND OF THE INVENTION

Flash memory devices (or simply "flash devices") are well known in the art. Such devices may be used by a host system for storing data in flash media, which may be of NOR or NAND type. The operation of flash memory devices is typically controlled (managed) by a microprocessor-based controller with the help of a non volatile random access memory such as ROM/NOR and, in some cases, of a volatile random access memory such as RAM, DRAM or PSRAM. The flash device and the host system communicate via a communication port in the flash device. The components of the flash device are typically housed together in a common housing.

The controller may perform read operations, write operations and erase operations on the flash media. Exemplarily, NAND flash media are typically written in units called "pages", each of which typically includes between 512 bytes and 2048 bytes, and are typically erased in units called "blocks", each of which typically includes between 16 and 64 pages. After a block is erased by the flash management algorithm, it is normally marked immediately with an "erase mark" and an "erase count" for that block is immediately updated by a counter (by the flash management algorithm). The erase count indicates the number of erase events performed on each block. This count is important, as too many erase operations performed on a given block lead to wear. In order to prevent too much wear of a particular block, wear-leveling algorithms are used to try and distribute the Erase operations more or less evenly among the blocks.

The erase count of a specific block can be stored in the block itself (reserved area) or in another flash area (such as in a table that stores the erase counts of all blocks in the flash memory).

If a power loss (power failure) occurs between the erase operation and the erase count update operation, the flash manager (controller) loses the erase count of the particular block, as explained below. A typical process of updating an erase count of an erased block is as follows: a) the existing erase count is read into a volatile memory (e.g. RAM); b) the erase count in the RAM is incremented by 1; and c) the new erase count is written into the erased block. A power failure may cause the loss or invalidation of the erase count at any stage of this updating process, since during the process the flash manager is typically using and relying on an intermediate erase count stored in a volatile memory. By "invalid erase count" is meant an erase count whose check sum (CRC) is incorrect (in some cases the erase count is stored with its CRC); an erase count that exceeds a maximum erase count number ("maximum erase count" being defined, e.g., by the flash memory manufacturer or by a wear leveling algorithm); or an erase count that is out of the range of the "erase count tolerance.") Example detailed scenarios whereby an erase count may become lost or invalidated are as follows:

1. When the flash manager (using a flash management algorithm) needs to erase a block, it reads the erase count of the block to be erased from the flash media and copies it to a volatile memory (RAM or DRAM). The flash manager then erases the block, the erase count is incremented and the erase count checksum is calculated by the flash manager (which stores the erase count and the erase count checksum in the volatile memory). The flash manager then aims to write the updated erase count and the checksum into the erased block. During this time, i.e., prior to writing or during writing, if there is a power failure, the erase count and/or the checksum may be only partially written. When the flash manager reads the block erase count and tries to verify it with the checksum, it will find a mismatch.

2. Another scenario is that at least one of the erase count bits has been flipped due to the fact that the flash manager has not refreshed the block. When a block is not erased for a period of time specified by the flash manufacturer, the block's bits are flipped. Consequently, it is required that in every such period of time, every block needs to be erased in order to avoid the situation of bit flips. When such a block (that stores data and has not been erased for some time) is read by the flash algorithm and its erase count parameter bits have been flipped, the erase count will not match the checksum that is also stored in the flash. In this case the flash algorithm may consider the erase count as invalid. Another situation of invalid erase count is when the bits of the checksum have been flipped. In this case the erase count will not match the checksum and thus the erase count will be considered an invalid erase count.

Existing approaches to overcome the problem of lost or invalid erase counts include, first, marking the block whose erase count is lost/invalid as a "bad" block, i.e. one that cannot be written too, and, second, defining the block whose erase count is lost/invalid as one that has not been erased yet (count set to 0). Both of these approaches have disadvantages, the first quickly leading to too many "bad" blocks, and the second being too risky.

A typical prior art method operates as follows. In a first step, the flash manager receives a command to erase a block. Next, the flash manager checks the counter of an erasable block i. If the erase count is found, the flash manager determines the best block to erase in the memory (for example, using a wear leveling procedure, as is well known in the art). If an erase count is not found, the flash manager assigns a zero erase count to block i or marks the block as a bad block, and then proceeds to determine the best block to erase.

Accordingly, there is a widely recognized need for, and it would be highly advantageous to have, a method of updating or replacing a lost or invalid erase count of a given block of a flash memory, which would overcome the limitations of the prior art.

SUMMARY OF THE INVENTION

The present inventor provides a method of updating a lost or invalid erase count of a given block which includes the steps of obtaining a new erase count for the given block using known erase counts of other blocks of the flash memory and assigning the new erase count to the given block.

In some embodiments, the step of obtaining includes calculating an average value of the known erase counts and setting the new erase count to the average value.

In some embodiments, the step of obtaining includes determining a maximum value of the known erase counts and setting the new erase count to the maximum value.

In some embodiments, the step of obtaining includes determining a maximum value of the known erase counts and setting the new erase count to a sum of the obtained maximum value and a value of an erase count tolerance.

In some embodiments, the average value or the maximum value is obtained using a wear-leveling algorithm.

In some embodiments, the average value or the maximum value is obtained using an erase history.

In some embodiments, the wear leveling algorithm is run on a platform selected from the group consisting of a flash memory device, a host device and a network server.

In some embodiments, the step of obtaining is performed in response to a power failure due to which a previous erase count of the given block is lost.

BRIEF DESCRIPTION OF THE DRAWINGS

The invention is herein described, by way of example only, with reference to the accompanying drawings, wherein.

DETAILED DESCRIPTION OF THE INVENTION

Figure 1:
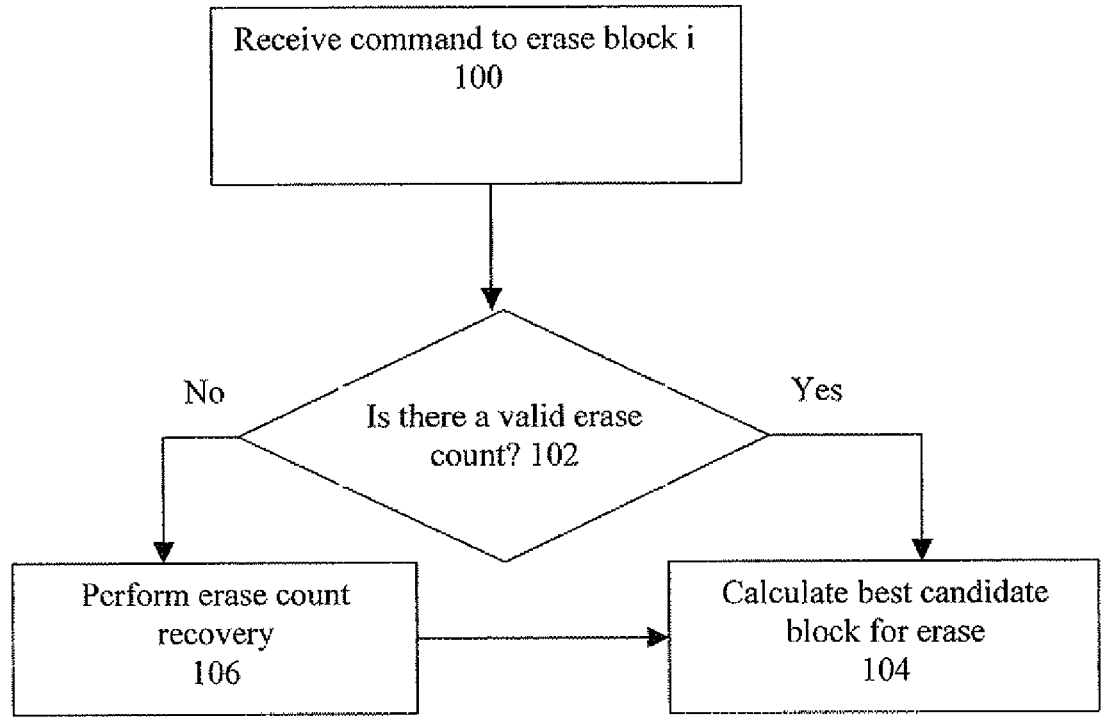
FIG. 1 shows a flow chart of a method according to an example embodiment.

According to an example embodiment, a flash manager using a flash management algorithm obtains a new erase count for a block for which the erase count was lost, using known erase counts of other blocks of the flash memory, and assigns the new erase count to the block. In some embodiments, the flash management algorithm performs wear leveling (and is also referred to as a wear leveling algorithm) and the known erase counts may be obtained from wear leveling information. The flash management algorithm may be executed on the flash memory device processor/controller or on another device (which is not a flash device). The other device may be, e.g., a host side flash controller, a host side volatile memory ("VM", exemplarily a RAM or DRAM) or a network server to which the flash device is operationally connected. The flash management algorithm typically uses a volatile memory to store an intermediate erase count. This volatile memory may but need not be located independently of the flash memory and/or of the location from which the flash management algorithm is executed (for example, the volatile memory may but need not be located on the host device RAM/DRM, or on the network server).

Obtaining known erase counts of blocks of a flash memory from wear leveling information may be performed as follows. When the flash manager needs to erase (according to the flash management algorithm) a block, it reads (from a specific area of the block that is reserved for storing the erase count) the erase count of the block to be erased and copies it to a volatile memory (RAM or DRAM). The flash manager then erases the block, increments the erase count and calculates the erase count checksum. The flash manager then stores the incremented (updated) erase count and the calculated erase count checksum in the volatile memory, and then aims to write the updated erase count and the erase count checksum into the erased block. This way of obtaining known erase counts from wear leveling information is known to those of skill in the art.

As an alternative to obtaining the known erase counts from wear leveling information, the known erase counts may be obtained from an erase history, which may be stored, e.g., in a logical or physical area dedicated for that purpose, on the flash memory device, on a host device to which the flash memory device is operatively connectable or on a network to which both the host device and the flash memory device are operatively connectable. The logical or physical area dedicated to storing erase history is, e.g., a table in which every table entry is reserved for a specific physical block, e.g., entry #n is dedicated for erase block #n. This dedicated area may consist of more than one block. Obtaining known erase counts of blocks of a flash memory from an erase history may be performed as follows. When the flash manager needs to erase (according to the flash management algorithm) a block, it reads (from the erase history) the erase count of the block to be erased and copies it to a volatile memory (RAM or DRAM). The flash manager then erases the block, increments the erase count in the volatile memory (RAM or DRAM) and calculates the erase count checksum. The flash manager then stores the incremented (updated) erase count and the calculated erase count checksum in the volatile memory and then aims to write the updated erase count and the erase count checksum into the erased block. This way of obtaining known erase counts from an erase history is known to those of skill in the art.

FIG. 1 shows a flow chart of a method involving a flash management algorithm executed by a flash manager, according to an example embodiment. In a first step 100, the flash manager receives a command to erase a block. In step 102, the flash manager checks the counter of an erasable block i. If a valid erase count is found (Yes), the flash manager determines the best block to erase in the memory (for example, using a wear leveling procedure, as is well known in the art) in step 104. If a valid erase count is not found (No), the flash manager initiates an erase count recovery procedure for block i as described below and sets a new erase count value to this block in step 106, after which the algorithm proceeds to step 104 of selecting the best candidate to be erased.

Figure 2:
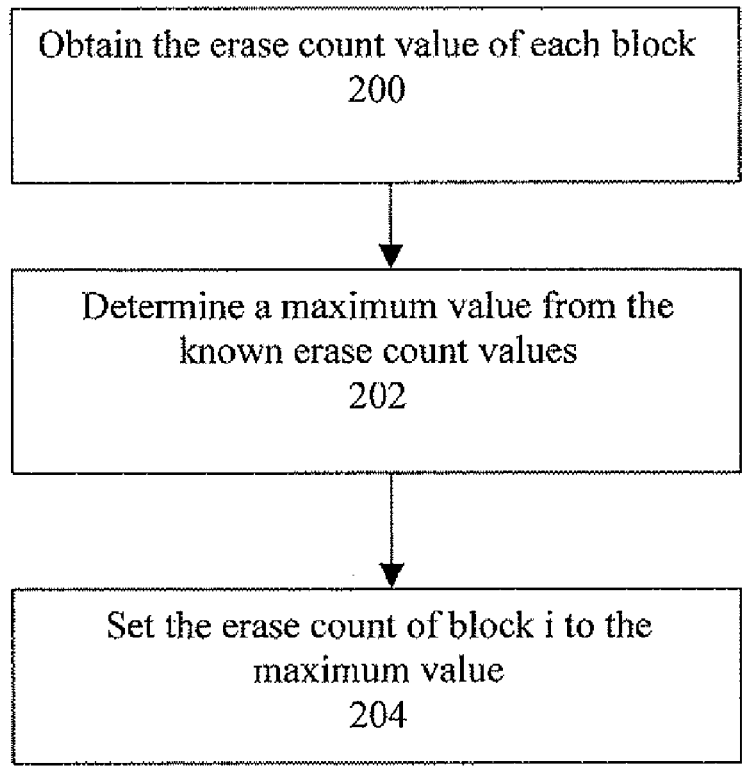
FIG. 2 shows sub-steps of the erase count recovery and new erase count setting procedures for a block in some embodiments.

FIG. 2 shows sub-steps of the erase count recovery and new erase count setting procedures for block i in step 106 in some embodiments. The flash manager obtains the erase count value of each block of the memory in step 200. The ways in which this may be performed, using wear leveling information or using an erase history, has been described above. The flash manager then determines a maximum value from the known erase count values in step 202 and sets the erase count of block i to the maximum value in step 204. In some embodiments, the maximum value may be obtained from wear leveling data, obtained through the flash management algorithm. Determining the maximum value from wear leveling data may be performed by the following operations.

When the flash manager finds that the erase count is not valid, it needs to determine the maximum block erase count value in the flash. One method of determining the maximum erase count is, upon detection of an invalid erase count of a block that is aimed to be erased, to read the erase count values of all blocks sequentially (from wear leveling information). The flash manager stores a temporary parameter that includes the maximum value of an erase count of the read blocks. Herein, this parameter is called "temp max erase count". Prior to start reading the block erase count values sequentially, the flash manager sets the value of the temp max erase count to 0.

The flash manager then starts to read sequentially all the erase counts. When it finds that a currently read block erase count is larger than the temp max erase count value, it updates the temp max erase count with the currently read block erase count value. The process of determining the maximum erase count is completed after the flash manager reads the last block erase count and compares it to the temp max erase count.

Another method of determining the maximum erase count is to first perform the previous determination of the maximum erase count just once. This operation may be performed by the flash management algorithm only between the events of a power up and the first time it needs to erase a block. After the determination is performed once, every time the flash manager completes the erase operation of a block, it checks if the new updated erase count of the erased block is larger than the temp max erase count. If it is larger, the flash manager updates the temp max erase count with the value of the erase count of the block that has just been erased. All of these operations are known to those of skill in the art. In other embodiments, the maximum value may be determined from erase history data that may be stored, e.g., on the flash memory device, on the host device or on the network server to which both the host device and the flash memory device are operatively connectable. Determining the maximum value from erase history data may be performed as described above, but the retrieving of the erase count values is done from the erase history rather than from wear leveling information.

Figure 3:
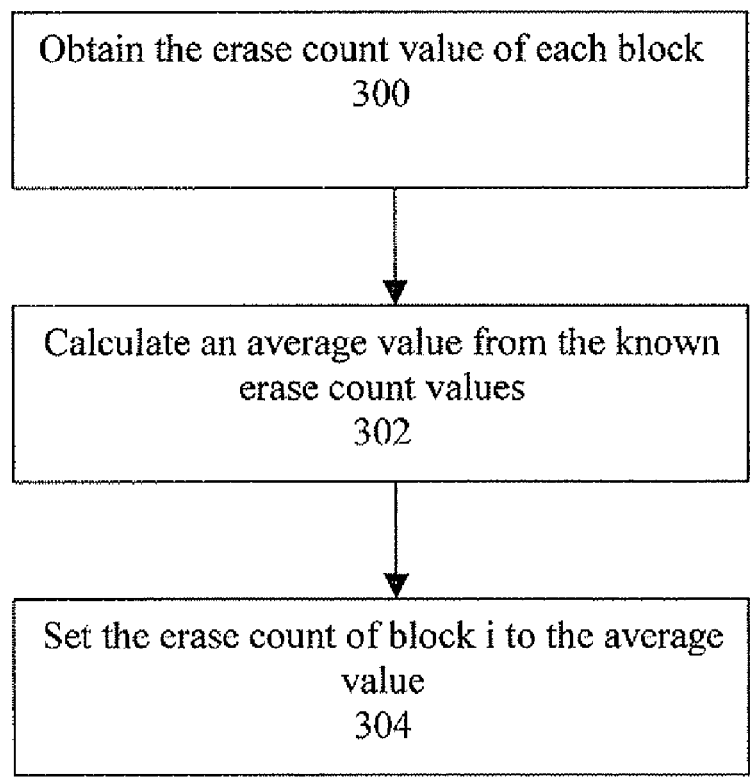
FIG. 3 shows sub-steps of the erase count recovery and new erase count setting procedures for a block in other embodiments.

FIG. 3 shows sub-steps of the erase count recovery and new erase count setting procedures for block i in step 106 in other embodiments. The flash manager obtains the erase count value of each block of the memory in step 300. The ways in which this may be performed, using wear leveling information or using an erase history, has been described above. The flash manager then calculates an average value from the known erase count values in step 302 and sets the erase count of block i to the average value in step 304. One method of calculating the average erase count is to read the erase count values of all blocks, add all values to a total erase count, divide the total erase count by the number of blocks in the flash, and store the result in a temporary average erase count ("temp average erase count") in a volatile memory. Another method of calculating the average erase count includes performing steps 300-304 only once, between the events of a power up and the first time the flash management algorithm needs to erase a block. After the calculation is done once, the average erase count is updated every time a block is erased as follows: every time the flash management erases a block, it multiplies the value stored in the temp average erase count by the number of blocks in the flash, yielding a "product". The product value is incremented by one, and the new incremented value is divided by the number of blocks in the flash and then stored back in the temp average erase count. All of these operations are known to those of skill in the art.

An example for the latter method for calculating an average erase count value is given next: Assume we have 4 blocks in the flash. Assume two blocks have each an erase count of 6 and two blocks have each an erase count of 8. The average erase count value calculated once is (6+6+8+8)/4=7. This number is stored as the temp average erase count. Assume one block (say with an erase count of 6) is erased. The temp average erase count (7) is then multiplied by the number of blocks (4) to get a product=28. The product is then incremented by 1, i.e. 28+1=29. A new average erase count is then calculated by dividing the incremented product by the number of blocks 29/4=7.25

As with the maximum value, the average value may be obtained from erase history data that may be stored, e.g., on the flash memory device, on the host device or on the network server to which both the host device and the flash memory device are operatively connectable. Calculating the average value from erase history data may be performed as described above, but retrieving the erase count values from the erase history rather than from wear leveling information.

Figure 4:
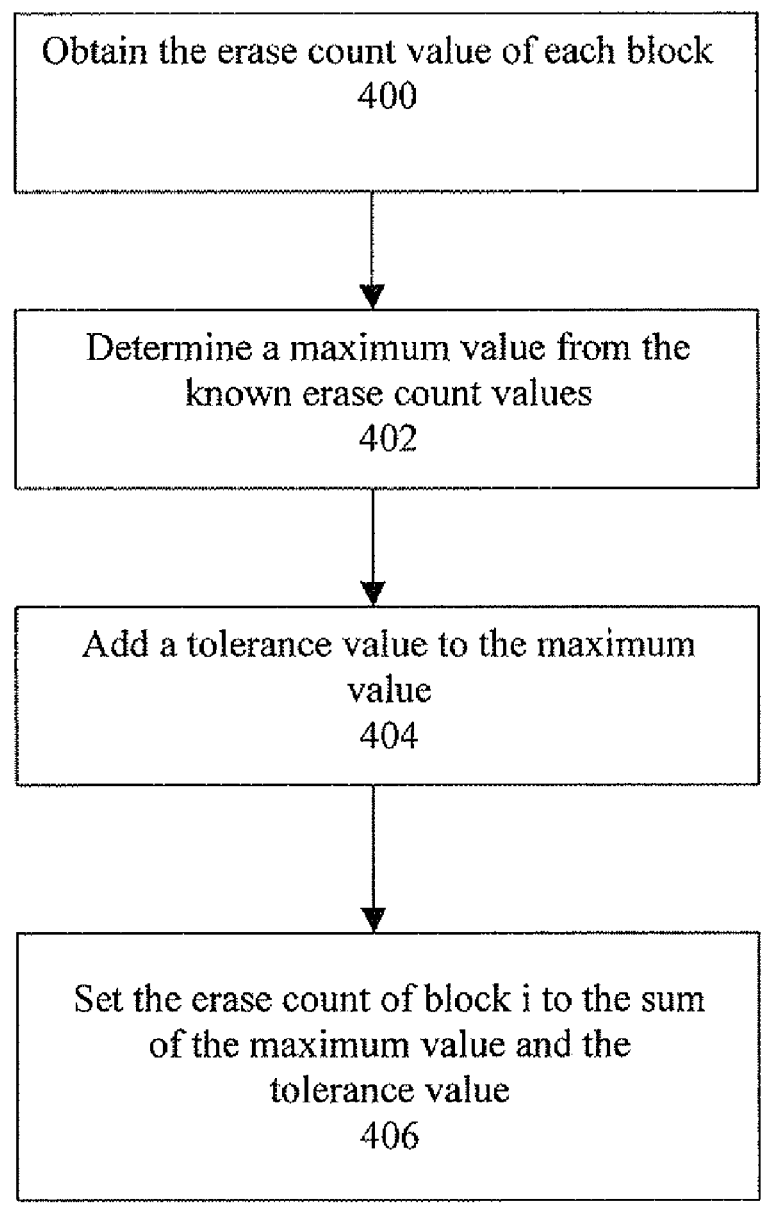
FIG. 4 shows sub-steps of the erase count recovery and new erase count setting procedures for a block in yet other embodiments.

FIG. 4 shows sub-steps of the erase count recovery and new erase count setting procedures for block i in step 206 in yet other embodiments. The flash manager obtains the erase count value of each block of the memory in step 400. The ways in which this may be performed, using wear leveling information or using an erase history, has been described above. The flash manager then determines a maximum value from the known erase count values in step 402, adds to this value a tolerance value in step 404, and sets the erase count of block i to the sum of the maximum value and the tolerance value in step 406. In some embodiments, the maximum value may be determined from wear leveling data through the flash management algorithm, as was described above with reference to FIG. 3. In other embodiments, the maximum value may be determined from erase history data that may be stored, e.g., on the flash memory device, on the host device, or on the network to which both the host device and the flash memory device are operatively connectable, as was described above with reference to FIG. 3. This algorithm may employ an assumed tolerance value such as an erase count value (e.g., 10) or a percentage of the maximum value (e.g., 10%). The tolerance value employed may be varied over a suitable range of values and types of values, as will be understood by one of skill in the art.

Example: assume the known erase counts for five blocks are as follows: 1000, 1100, 800, 1500, and 600. Using the maximum value, the new erase count for a sixth block with a lost erase count would be 1500. Using the average value or another arithmetic mean value, the new value would be 1000. Using the maximum value plus a tolerance of 10 percent would be 1500+150=1650. Using the maximum value plus a tolerance value of 10 would be 1510.

The scope of the invention includes the method of updating or replacing a lost or invalid erase count of a given block of a flash memory, described above. The scope of the invention also includes a flash memory system comprising a flash memory and a controller for the memory employing this method of updating or replacing a lost or invalid erase count. The scope of the invention also includes a computing system comprising a memory system employing this method of updating or replacing a lost or invalid erase count. The scope of the invention also includes a computing system comprising a memory and a host computer employing this method of updating or replacing a lost or invalid erase count, where no dedicated memory controller is used. The scope of the invention also includes a computer-readable storage medium bearing code for implementing this method of updating or replacing a lost or invalid erase count.

The software running an algorithm of the method of the invention may be implemented either within a dedicated memory controller that is part of the memory devices or within a host computer that attaches directly to the memory (with no intervening controller) and runs software that manages the memory.

While the invention has been described with respect to a limited number of embodiments, it will be appreciated that many variations, modifications and other applications of the invention may be made. Those skilled in the art will appreciate that the invention can be embodied by other forms and ways, within the scope of the invention. The embodiments described herein should be considered as illustrative and not restrictive.

What is claimed is:

1. A method of updating a lost or invalid erase count of a given block of a flash memory, the method comprising the steps of:
   a. obtaining a new erase count for the given block of a flash memory, using known erase counts of other blocks of the flash memory; and
   b. assigning the new erase count to the given block,
   wherein the step of obtaining includes calculating an average value of the known erase counts and setting the new erase count to the average value.

2. The method of claim 1, wherein the calculating an average value includes calculating an average value using a wear-leveling algorithm.

3. The method of claim 2, wherein the wear leveling algorithm is run on a platform selected from the group consisting of a flash memory device, a host device and a network server.

4. The method of claim 1, wherein the calculating an average value includes calculating an average value using an erase history.

5. The method of claim 1, wherein the wear leveling algorithm is run on a platform selected from the group consisting of a flash memory device, a host device and a network server.

6. The method of claim 1, wherein the step of obtaining is performed in response to a power failure due to which a previous erase count of the given block is lost.

7. A method of updating a lost or invalid erase count of a given block of a flash memory, the method comprising the steps of:
   a. obtaining a new erase count for the given block of a flash memory, using known erase counts of other blocks of the flash memory; and
   b. assigning the new erase count to the given block, wherein the step of obtaining includes determining a maximum value of the known erase counts and setting the new erase count to the maximum value.

8. The method of claim 7, wherein the determining a maximum value includes determining a maximum value using a wear-leveling algorithm.

9. The method of claim 8, wherein the wear leveling algorithm is run on a platform selected from the group consisting of a flash memory device, a host device and a network server.

10. The method of claim 7, wherein the determining a maximum value includes determining a maximum value using an erase history.

11. A method of updating a lost or invalid erase count of a given block of a flash memory, the method comprising the steps of:
    a. obtaining a new erase count for the given block of a flash memory, using known erase counts of other blocks of the flash memory; and
    b. assigning the new erase count to the given block, wherein the step of obtaining includes determining a maximum value of the known erase counts and setting the new erase count to a sum of the obtained maximum value and a value of an erase count tolerance.

12. The method of claim 11, wherein the determining a maximum value includes determining a maximum value using a wear-leveling algorithm.

13. The method of claim 11, wherein the determining a maximum value includes determining a maximum value using an erase history.

14. A non-transitory computer readable storage medium having computer readable code embodied in the computer readable storage medium, the computer readable code comprising instructions for updating a lost or invalid erase count of a given block of a flash memory, by:
    a) obtaining a new erase count for the given block of a flash memory, using known erase counts of other blocks of the flash memory; and
    b) assigning the new erase count to the given block;
    wherein the obtaining a new erase count for a given block of a flash memory using known erase counts of other blocks of the flash memory includes calculating an average value of the known erase counts, and wherein the assigning the new erase count to the given block includes setting the new erase count to the average value.

15. The computer readable storage medium of claim 14, wherein the calculating an average value includes calculating an average value using a wear-leveling algorithm.

16. The computer readable storage medium of claim 15, wherein the wear leveling algorithm is run on a platform selected from the group consisting of a flash memory device, a host device and a network server.

17. The computer readable storage medium of claim 14, wherein the calculating an average value includes calculating an average value using an erase history.

18. The computer readable storage medium of claim 14, wherein the obtaining a new erase count for a given block of a flash memory using known erase counts of other blocks of the flash memory is performed in response to a power failure due to which a previous erase count of the given block is lost.

19. A non-transitory computer readable storage medium having computer readable code embodied in the computer readable storage medium, the computer readable code comprising instructions for updating a lost or invalid erase count of a given block of a flash memory, by:
    a) obtaining a new erase count for the given block of a flash memory, using known erase counts of other blocks of the flash memory; and
    b) assigning the new erase count to the given block, wherein the obtaining a new erase count for a given block of a flash memory using known erase counts of other blocks of the flash memory includes determining a maximum value of the known erase counts, and wherein the assigning the new erase count to the given block includes setting the new erase count to the maximum value.

20. The computer readable storage medium of claim 19, wherein the determining a maximum value includes determining a maximum value using a wear-leveling algorithm.

21. The computer readable storage medium of claim 20, wherein the wear leveling algorithm is run on a platform selected from the group consisting of a flash memory device, a host device and a network server.

22. The computer readable storage medium of claim 19, wherein the determining a maximum value includes determining a maximum value using an erase history.

23. A non-transitory computer readable storage medium having computer readable code embodied in the computer readable storage medium, the computer readable code comprising instructions for updating a lost or invalid erase count of a given block of a flash memory, by:
    a) obtaining a new erase count for the given block of a flash memory, using known erase counts of other blocks of the flash memory; and
    b) assigning the new erase count to the given block, wherein the obtaining a new erase count for a given block of a flash memory using known erase counts of other blocks of the flash memory includes determining a maximum value of the known erase counts, and wherein the assigning the new erase count to the given block includes setting the new erase count to a sum of the determined maximum value and a value of an erase count tolerance.

24. The computer readable storage medium of claim 23, wherein the determining a maximum value includes determining a maximum value using a wear-leveling algorithm.

25. The computer readable storage medium of claim 23, wherein the determining a maximum value includes determining a maximum value using an erase history.

26. The computer readable storage medium of claim 25, wherein the wear leveling algorithm is run on a platform selected from the group consisting of a flash memory device, a host device and a network server.

* * * * *